(12) United States Patent
McLean et al.

(10) Patent No.: US 9,304,860 B2
(45) Date of Patent: *Apr. 5, 2016

(54) ARRANGING DATA HANDLING IN A COMPUTER-IMPLEMENTED SYSTEM IN ACCORDANCE WITH RELIABILITY RATINGS BASED ON REVERSE PREDICTIVE FAILURE ANALYSIS IN RESPONSE TO CHANGES

(71) Applicant: INTERNATIONAL BUSINESS MACHINES CORPORATION, Armonk, NY (US)

(72) Inventors: James G. McLean, Fuquay-Varina, NC (US); Clifford A. Pickover, Yorktown Heights, NY (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,585

(22) Filed: Jun. 22, 2015

(65) Prior Publication Data

US 2015/0317206 A1 Nov. 5, 2015

Related U.S. Application Data

(63) Continuation of application No. 14/450,451, filed on Aug. 4, 2014, now Pat. No. 9,104,790, which is a continuation of application No. 13/545,823, filed on Jul. 10, 2012, now Pat. No. 8,839,046.

(51) Int. Cl.
| | | |
|---|---|---|
| *G06F 11/00* | (2006.01) | |
| *G06F 11/10* | (2006.01) | |
| *G06F 17/30* | (2006.01) | |
| *G06F 11/34* | (2006.01) | |
| *G06F 11/20* | (2006.01) | |

(52) U.S. Cl.
CPC .......... *G06F 11/1096* (2013.01); *G06F 11/008* (2013.01); *G06F 11/1076* (2013.01); *G06F 11/3409* (2013.01); *G06F 17/30306* (2013.01); *G06F 17/30575* (2013.01); *G06F 11/2071* (2013.01); *G06F 11/2094* (2013.01); *G06F 2211/1059* (2013.01); *G06F 2211/1061* (2013.01)

(58) Field of Classification Search
None
See application file for complete search history.

(56) References Cited

U.S. PATENT DOCUMENTS

| | | | |
|---|---|---|---|
| 7,191,283 B2 | 3/2007 | Amemiya et al. | |
| 7,580,956 B1 * | 8/2009 | Xin et al. | |
| 8,005,654 B2 | 8/2011 | Boldyrev et al. | |
| 8,131,961 B2 * | 3/2012 | Rajan et al. | 711/162 |
| 2003/0204788 A1 * | 10/2003 | Smith | 714/47 |

(Continued)

*Primary Examiner* — Yolanda L Wilson
(74) *Attorney, Agent, or Firm* — Griffiths & Seaton PLLC

(57) ABSTRACT

Various embodiments for arranging data handling in a computer-implemented system comprising a plurality of existing physical entities include assigning at least one reliability rating to various said existing physical entities of the computer-implemented system; and using the assigned reliability ratings in accordance with reverse predictive failure analysis, to provide a designated cumulative reliability rating, the designated cumulative reliability rating being determined in accordance with the following equation: $1-[PAF(f+\Delta f, n+\Delta n)]=1-[PAF(f, n)+(\partial PAF/\partial f)*\Delta f+(\partial PAF/\partial n)*\Delta n]$, where PAF is a probability of failure of the computer-implemented system, f is a probability of failure of a physical entity, and n is a number of drives in the computer-implemented system.

47 Claims, 10 Drawing Sheets

(56) References Cited

U.S. PATENT DOCUMENTS

2004/0103337 A1* 5/2004 Smith .............................. 714/2
2006/0195728 A1* 8/2006 Lin et al. ........................ 714/42
2007/0050543 A1* 3/2007 Pomerantz .................... 711/114
2008/0244318 A1* 10/2008 Guha ............................. 714/37
2009/0089503 A1* 4/2009 Yoshida et al. ............... 711/114

* cited by examiner

ARRANGING DATA HANDLING IN A COMPUTER-IMPLEMENTED SYSTEM IN ACCORDANCE WITH RELIABILITY RATINGS BASED ON REVERSE PREDICTIVE FAILURE ANALYSIS IN RESPONSE TO CHANGES

CROSS-REFERENCE TO RELATED APPLICATION

This application is a Continuation of U.S. patent application Ser. No. 14/450,451, filed Aug. 4, 2014, which is a Continuation of U.S. patent application Ser. No. 13/545,823, filed Jul. 10, 2012.

FIELD OF THE INVENTION

This invention relates to computer entities in computer-implemented systems, and more particularly to dynamically arranging the data handling within such systems.

BACKGROUND OF THE INVENTION

Computer-implemented systems have become complex and involve various entities such as data storage media, network components, data storage systems, memories, etc. Components of systems, such as data storage systems such as RAID (redundant array of independent disks) are themselves complex computer-implemented systems.

Networks and other systems may have various paths available which employ different ones of the entities.

An example of a data storage system comprises an IBM® ESS (Enterprise Storage Server) such as a DS8000, which has redundant clusters of computer entities, cache, non-volatile storage, etc.

The data storage system is accessed over networks, each of which comprises a plurality of entities, such as adapters, switches and communication links. The data storage may comprise a RAID system or other types of data storage. RAID systems may be arranged in various levels and with different numbers of data storage entities, thereby providing differences in reliability of the overall system.

Reliability of such computer-implemented systems is important and the systems are typically set up to provide optimum reliability and throughput, often with redundancy. Some types of activities require maximum reliability with less potential for failure as compared to other activities, for example, a write operation requires maximum reliability to insure that data is stored correctly, while a read operation may be repeated without harm to the data. The potential failure rates of the entities within the systems may be subject to change over time. These and other issues may affect the intended reliability.

SUMMARY OF THE INVENTION

Methods, systems, and computer program products are provided for arranging data handling for computer-implemented systems comprising a plurality of existing physical entities.

In one embodiment, the method for arranging data handling, comprises assigning at least one reliability rating to various existing physical entities of the computer-implemented system; and using the assigned reliability ratings in accordance with reverse predictive failure analysis, to provide a designated cumulative reliability rating, the cumulative reliability rating being determined in accordance with the following equation:

$$1-[PAF(f+\Delta f, n+\Delta n)] = 1-[PAF(f,n) + (\partial PAF/\partial f)*\Delta f + (\partial PAF/\partial n)*\Delta n]$$

where:
PAF=probability of failure of the array
f=probability of failure of a physical entity
n=number of drives in the array A further embodiment additionally comprises, in response to change, re-arranging data handling with respect to at least a portion of the existing computer-implemented system physical entities.

A further embodiment additionally comprises the steps of aggregating and updating information regarding usage over time of physical entities of at least one given type, and assigning at least one reliability rating as a function of the aggregate information to at least one of the physical entities.

In another embodiment, the type of data handling is subject to alteration; and the re-arranging is conducted to match the alteration.

In a still further embodiment, the change comprises a change in capacity of the system.

In another embodiment, the reliability ratings are subject to change, and the step of assigning the at least one reliability rating comprises assigning updated reliability ratings to the existing physical entities.

In still another embodiment, the re-arranging comprises deleting at least one of the physical entities with respect to the portion of the system.

In a further embodiment, the system comprises a hierarchical data storage system of a plurality of rungs of data storage, and the re-arranging comprises deleting at least one of the plurality of rungs from data storage, skipping the deleted at least one rung.

In another embodiment, the rearranging comprises changing the system status of at least one of the physical entities with respect to the portion of the system.

In still another embodiment, the system comprises a network having network components, and the re-arranging comprises changing the network tasks to utilize different ones of the network components.

In a RAID data storage system comprising a plurality of data storage physical entities arranged in an array to provide data storage and parity storage, an embodiment comprises the steps of assigning at least one reliability rating to various data storage physical entities of the RAID data storage system; and, in response to change, re-arranging data handling with respect to a portion of the data storage physical entities, using the assigned reliability ratings in accordance with reverse predictive failure analysis, to provide a designated cumulative reliability rating.

Another embodiment additionally comprises the steps of aggregating and updating information regarding usage over time of data storage physical entities of at least one given type, and assigning at least one reliability rating as a function of the aggregate information to at least one of the data storage physical entities.

In a further embodiment, re-arranging comprises changing a portion of data handling within the RAID from data storage to parity storage.

In another embodiment, the change comprises failure of a portion of the RAID data storage system.

In still another embodiment, the change comprises dynamic changes to the RAID data storage system, resulting in a change to a cumulative reliability rating.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
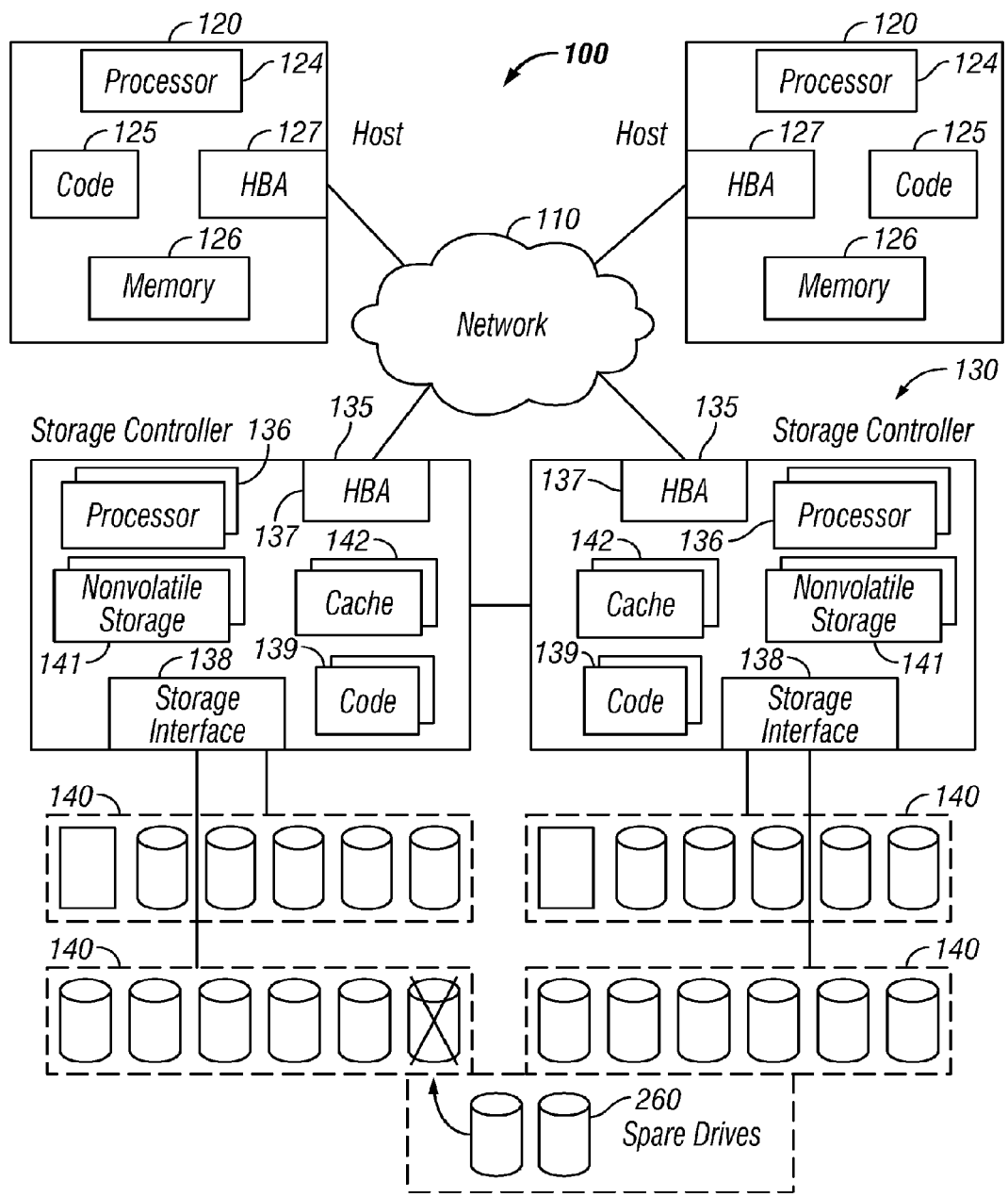
FIG. 1 is a block diagram of an exemplary computer-implemented system with a network and RAIDs which may implement aspects of the present invention.
Figure 2:
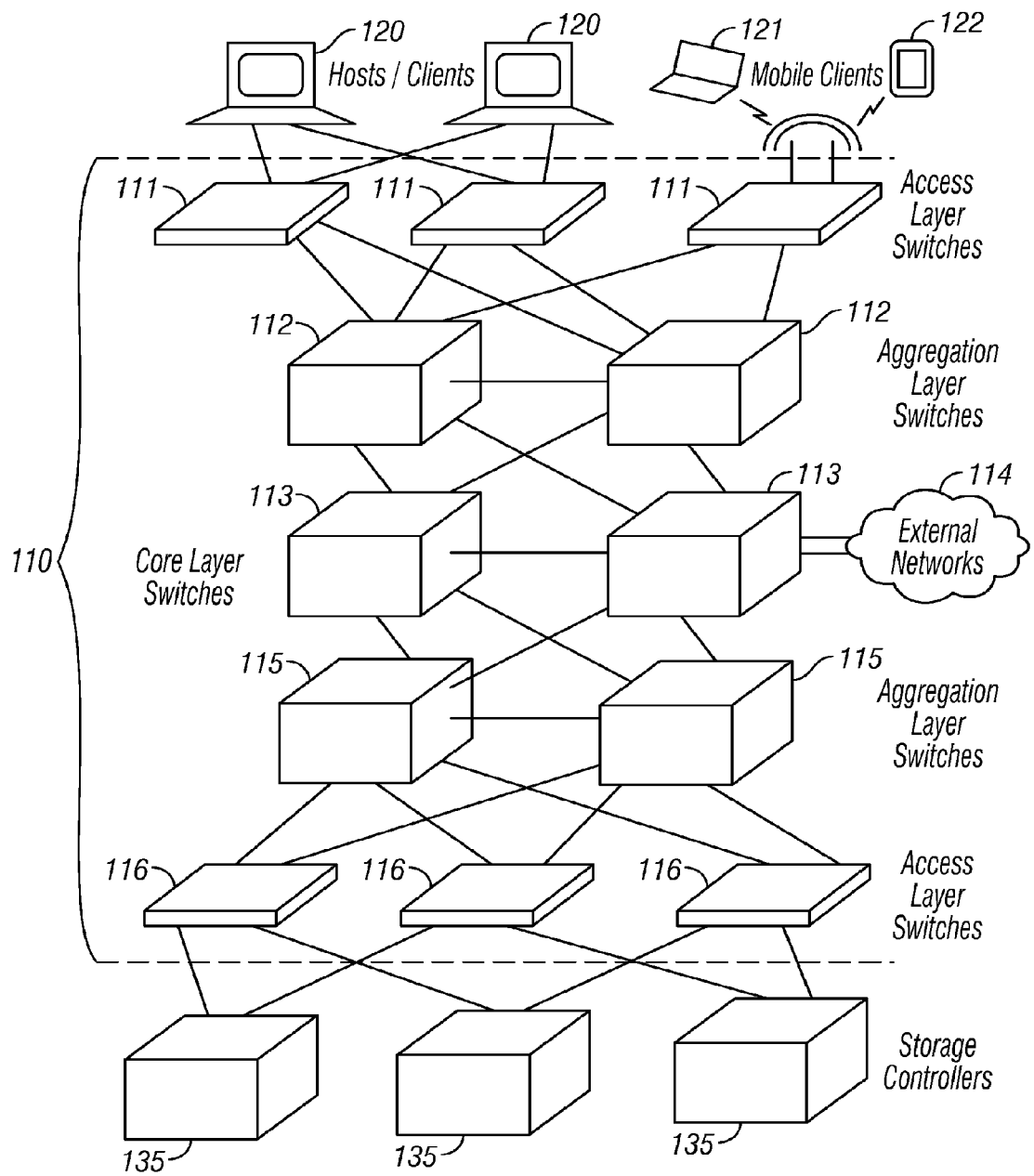
FIG. 2 illustrates various switches that may be involved in the network of FIG. 1.

Referring to FIGS. 1 and 2, an example of a computer-implemented system 100 is illustrated with a network 110 interconnecting hosts 120, 121, 122 and storage systems 130 having storage controllers 135 and data storage 140. Various types of networks 110, hosts 120 and storage systems 130 are known to those of skill in the art. The embodiments discussed herein are exemplary only and the resultant system is one of many computer-implemented systems which may implement the present invention.

Hosts 120, 121, 122 comprise various examples of computer-implemented systems and devices that may communicate across network 110, wherein hosts 120 are fixed within the network and hosts 121 and 122 are mobile. In the example, hosts 120 comprise at least one processor module 124, operated in accordance with code stored in module 125 and having memory 126 for, inter alia, handling data within the host, and at least one host bus adapter (HBA) 127 serving as the initial point of communication (input, output, or both) with the network 110, and may comprise ports or other points of communication. Mobile hosts 121 and 122 comprise similar modules and also communicate with the network 110.

Network 110 comprises an example of a typical complex network having multiple layers of switches to allow communication between the hosts 120, 121, 122 and storage systems 130. The network may comprise any of various forms, such as a wide area network (WAN), a local area network (LAN), a storage area network (SAN), a converged network, an intranet, the Internet, and/or the like networks. The network comprises layers of switches, and their interconnections, which can comprise wiring, fiber optics, wireless, and the like. Transmitters, receivers, amplifiers, etc. may also comprise the network. Of the illustrated layers, switches 111 comprise access layer switches giving access to both the fixed and mobile hosts 120, 121, 122. Aggregation layer switches 112 aggregate the connections occurring through the access layer switches 111. Core layer switches 113 combine the connections of the network 110, such as aggregation layer switches 112, with other networks 114, and connect to other aggregation layer switches 115. Second access layer switches 116 provide access to the storage controllers 135.

Figure 3:
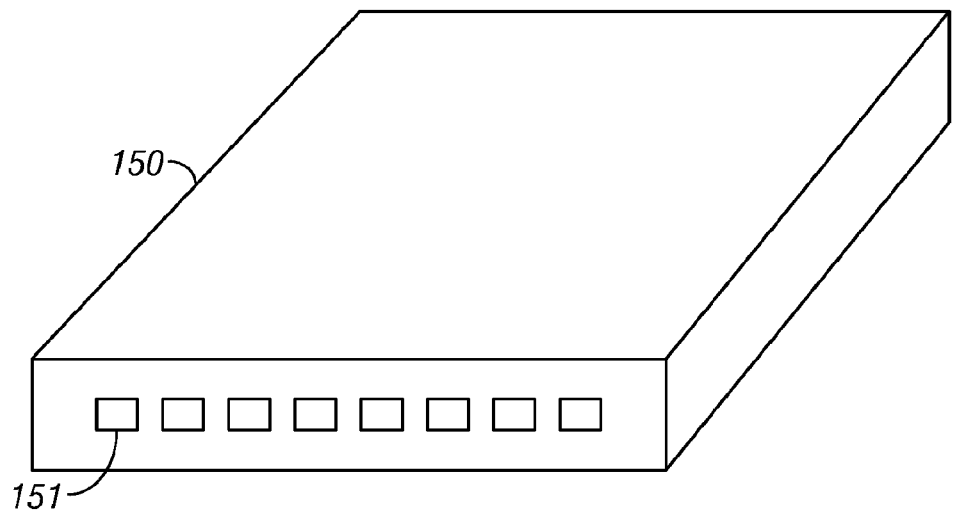
FIG. 3 illustrates an example of a computer-implemented switch for the network of FIG. 1.

FIG. 3 illustrates an exemplary switch 150 and its ports 151. A typical switch comprises processing with internal switching and modem capabilities, and the ports 151 may be similar or dissimilar and comprise small form-factor pluggable (SFP) connector ports for fiber optics, Ethernet ports such as wire connections (8P8C) (RJ45) and iSCSI (Internet SCSI) and FCoE (Fiber Channel over Ethernet), SCSI connector ports such as wire connections including SAS (Serial Attached SCSI), SATA (Serial ATA) wire connector ports, or RG coaxial cable ports (wire connection), or the like.

As shown, the storage control 135 comprises one or more servers with processors 136, host bus adapters 137 and storage interface device adapters 138 to provide the interfaces to connect the control 135 to host systems 120 and data storage 140, respectively. Processor modules 136 are operated in accordance with code stored in module 139, and have memory, for example comprising nonvolatile storage 141 and cache 142, all for handling data within the control. One example of a storage system 130 having an architecture similar to that illustrated in FIG. 1 is the DS8000™ Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the hosts 120, network 110 and storage systems 130 discussed herein are not limited to the examples illustrated, but may be implemented in any comparable systems, regardless of the manufacturer, product name, or components or component names associated with the system.

In the example, the computer processors 136 may comprise internal processing and storage capabilities to store software modules that run on the processors and, inter alia, are used to access data in the data storage 140. The memory may comprise a cache 142. Whenever a host 120 accesses data from a storage system 140, for example in a read operation, the storage controller 135 that performs the operation, for example reading data from storage 140, may save the data in its cache 142 in the event it may be required again. If the data is accessed again by a host 120, the controller 135 may fetch the data from the cache 142 instead of fetching it from storage 140, saving both time and resources. Similarly, when a host system 120 performs a write, the controller 135 may store, or host system 120 may direct that the data be stored, in cache 142 to be destaged to the storage 140 at a later time. When a write is stored in cache 142, the write may also be stored in non-volatile storage (NVS) 141 of another controller 135 so that the write can be recovered by the other controller 135 in the event the first controller fails.

Figure 4:
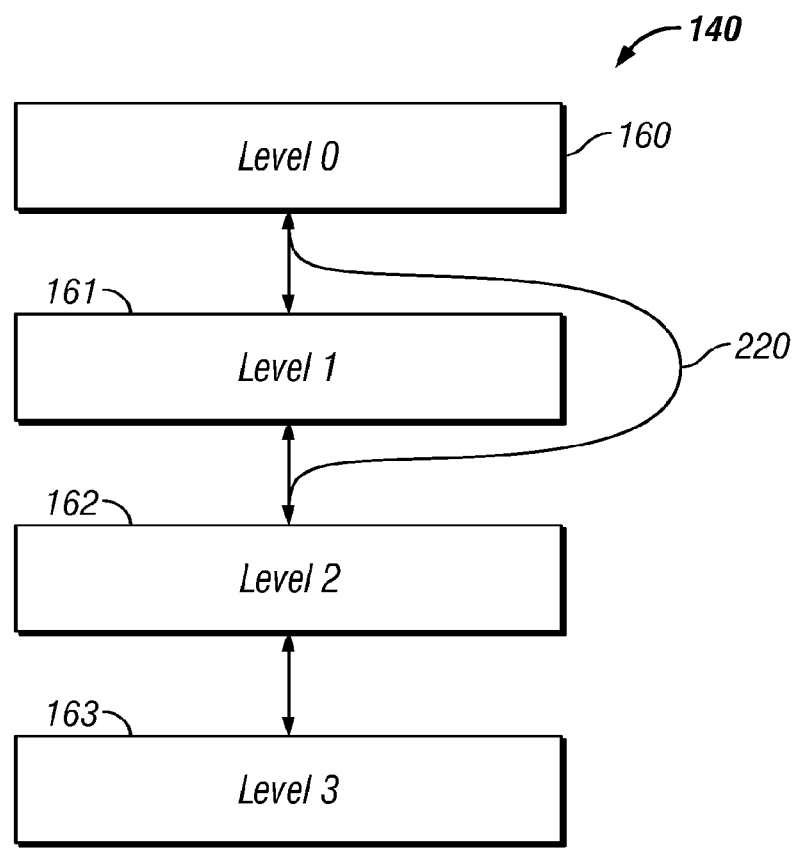
FIG. 4 illustrates an example of multi-level data storage.

FIG. 4 illustrates various levels of storage that may comprise data storage 140. The storage capacity typically increases with the lower levels of data storage, while the speed of access and the cost per unit of data are reduced. Also, the time period that the data is expected to be maintained in storage increases with the lower levels of data storage. As examples, Level 0 data storage 160 may comprise cache memory such as an electronic memory having direct random access, whereas Level 1 data storage 161 and Level 2 storage 162 may comprise flash memory or SSDs (solid state drives) based on flash memory. In one example, data storage 161 may have significantly less storage capacity and have quicker addressing than data storage 162 of greater storage capacity. Level 3 data storage 163 may comprise disk drives arranged in the form of RAID data storage. Data is staged from Level 3 data storage to Level 0 160 when needed by a requesting storage controller or by a host, and will stay in Level 0 so long as it is actively being used. Because of the many demands on Level 0 data storage, data is typically destaged out of Level 0 when it becomes inactive, or when it is specifically directed to be destaged. Data is often destaged, first to Level 1 161, then to Level 2 162 and lastly to Level 3 163. If redundancy is required, data may be simultaneously at more than one Level of data storage.

Various examples of RAID data storage of Level 3 161 are depicted in FIGS. 5, 6, 7 and 8, and others are also known in the art. RAID is a way of adding a redundancy to the data so that the data can be reconstructed even if there is a limited loss of data. A RAID system typically comprises more than one data storage drive and the limited loss of data can comprise a range from a small unit of data up to a catastrophic loss of data on one or more of the data storage drives.

A RAID-0 is not really a RAID, and is a drive or drives with no redundancy and offers no protection against data loss, and, since there is no redundancy, the data storage efficiency is 100%.

Figure 5:
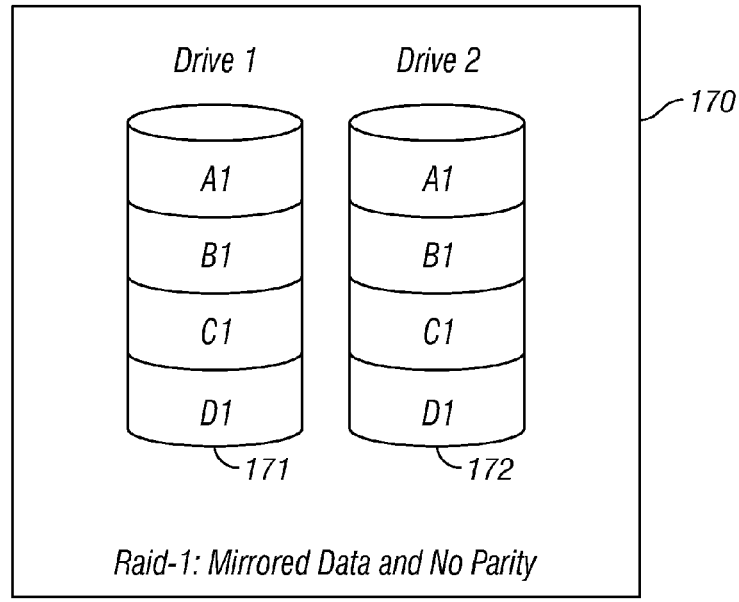
FIG. 5 illustrates a RAID-1 system.
Figure 6:
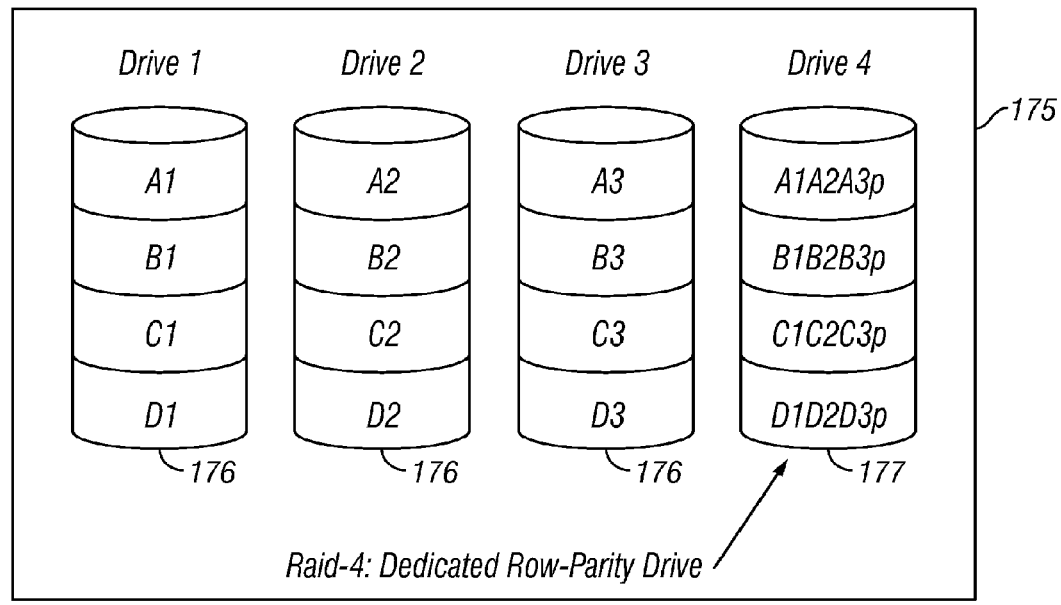
FIG. 6 illustrates a RAID-4 system.
Figure 7:
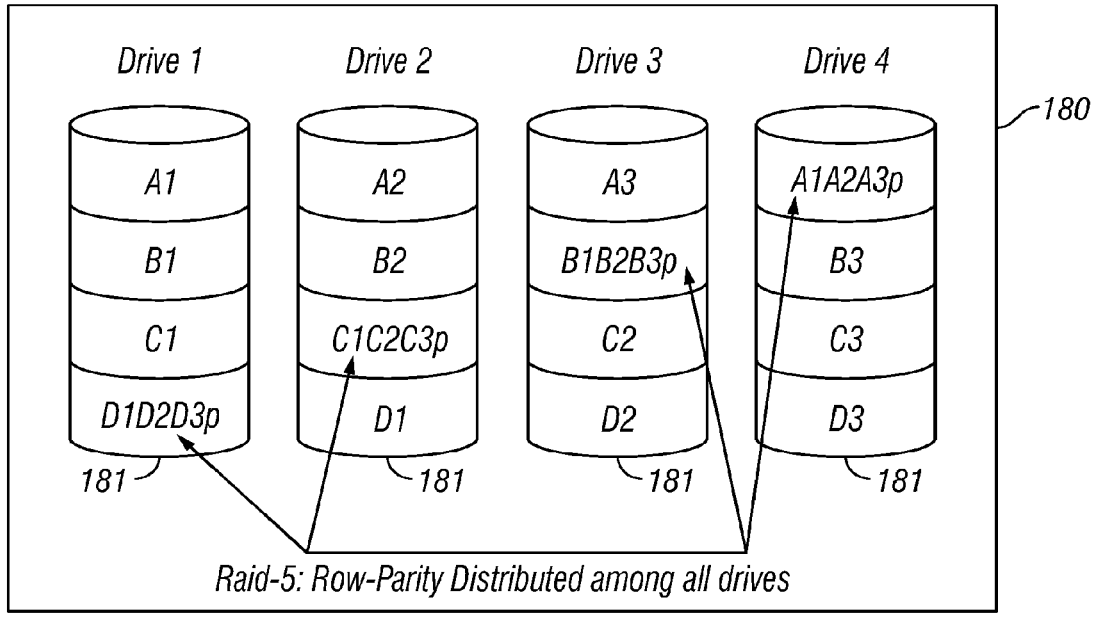
FIG. 7 illustrates a RAID-5 system.
Figure 8:
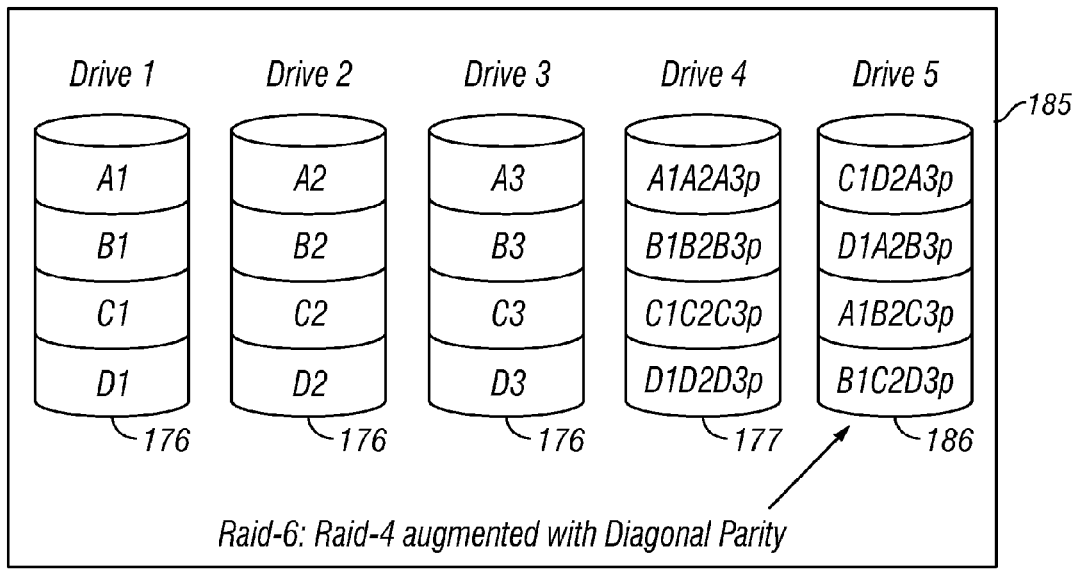
FIG. 8 illustrates a RAID-6 system.

RAID-1 170 is depicted in FIG. 5, and comprises an even number of data storage drives 171 and 172 where data stored on one data storage drive is copied (mirrored) on another data storage drive. Thus, if one data storage drive fails, the data is still available on the other data storage drive. RAID-4 175 is depicted in FIG. 6 and, like most RAID systems, is a "parity" RAID, where data is stored on more than one data storage drive 176, the data is summed and the parity (which makes the sum of the data, and the parity, equal to all the same bit) is stored separately 177 from the data. In RAID-4 175, the data is summed by rows and stored separately in a single data storage drive 177. RAID-5 180 depicted in FIG. 7 is the same as RAID-4 except that the parity is distributed among all of the data storage drives 181. In RAID-5, should one of the data storage drives fail, the parity data of that drive is lost but the original data still exists on the other drives and need not be reconstructed. RAID-6 185 as depicted in FIG. 8 is RAID-4 with a second set of parity data 186, for example diagonal parity, which allows two of the data storage drives to fail and still allows reconstruction of the original data.

The duplication represented by RAID data storage of FIGS. 5, 6, 7 and 8, by multiple switches of the network 110 of FIGS. 1, 2 and 3, and duplication within the levels of data storage of FIG. 4 allow recovery to be made upon failure of the components.

Rather than wait for failure, techniques have been designed to provide an indication of the probability of failure of individual components, and, if a component meets or exceeds a threshold probability of failure, it may be replaced. Herein, "f" denotes the component or drive failure probability, $0<f\ll1$.

An example of such a technique is the monitoring of ECC (error correction code) within an individual data storage drive (HDD or hard disk drive). For example, the ECC may be able to correct a number of failed bits out of a unit of data, but reaches a limit where the data cannot be corrected. Thus, a threshold is set at a level above which the number of correctable errors indicates that the drive is close enough to the limit that there is a risk that data will be lost in the near future. (For example, the ECC may correct 9 bits out of a sector comprising 512 bytes of data, and the threshold is set at 7 bits). Failure of the drive having the bad sector is prevented or postponed by moving the data to another sector of the drive, typically called a spare sector.

Another example is the monitoring of the use of the HDD spare sectors. For example, the HDD spare-sector table is monitored, and if the table is rapidly filling up because of failing sectors within the drive, a threshold may be reached which indicates imminent failure of the drive.

Still another example is the monitoring of RAID rebuild activity for less than a full data storage drive. For example, an individual sector becomes unreadable and must be rebuilt using parity (or the mirror). The occurrence of the rebuild or a number of rebuilds may trigger a threshold which indicates potential imminent failure of the drive.

Other techniques can relate to the run time without reported correctable or uncorrectable errors in devices or components or in a computing environment or network.

A manufacturer may provide an expected effective lifetime for the device or component, such as a MTBF (mean time before failure).

Many such techniques are known to those of skill in the art and relate to various components, devices and systems, and are sometimes called "predictive failure analysis". The predictive basis for setting thresholds is the subject of research and case analysis in the art.

Traditional predictive failure analysis is used to alert the user to proactively replace unreliable/failing components when they individually exceed an error threshold. Traditional predictive failure analysis has also been used to set up a system, for example, grouping drives so that only the most reliable drives or RAID store critical data.

Systems and components and their uses for data handling are not stagnant, and are subject to change. Also, the potential for failure is likely to change over time.

Figure 9:
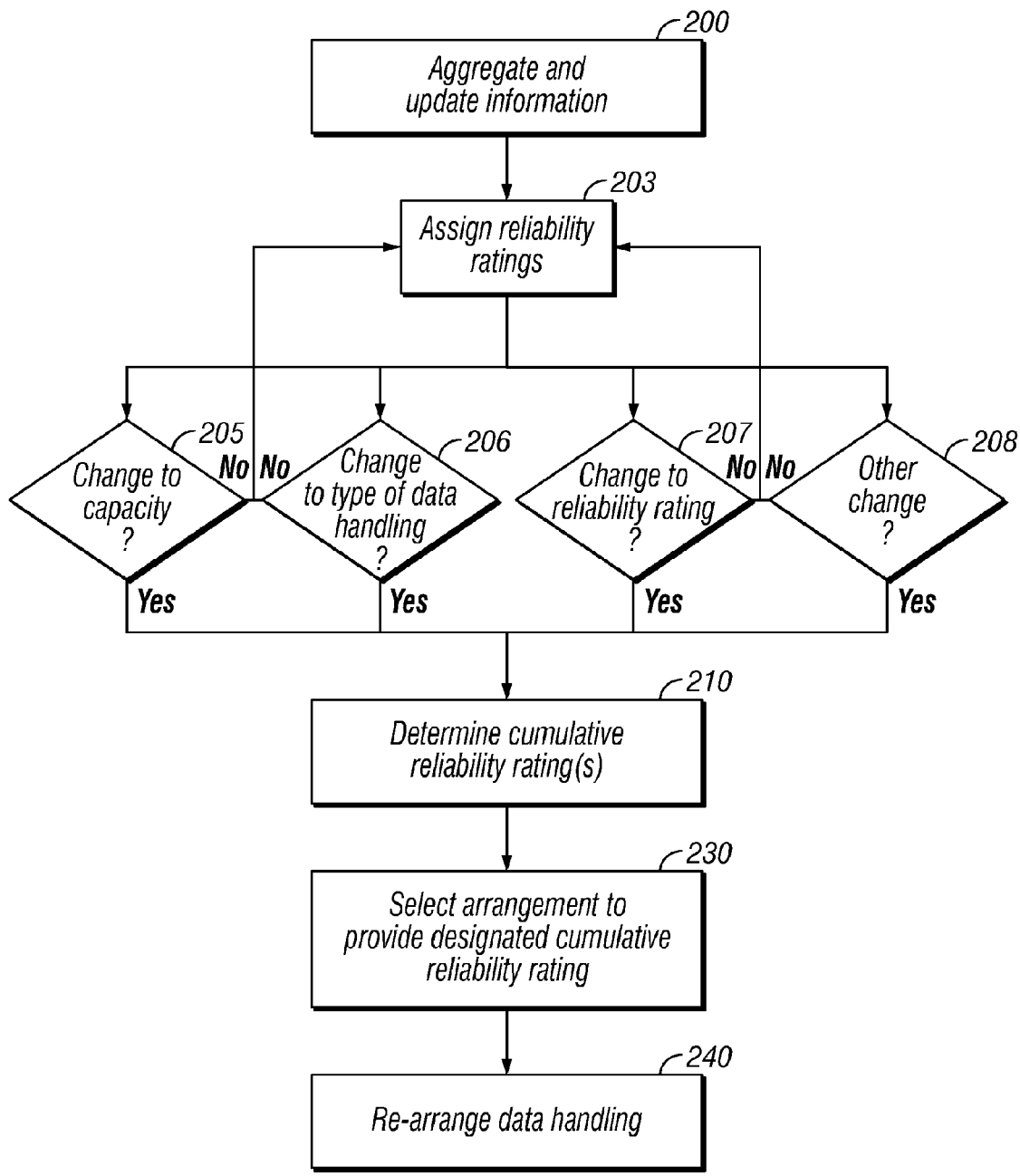
FIG. 9 is a flow chart depicting an exemplary method of re-arranging data handling of one or more of the systems of FIGS. 1-8.

With reference to FIG. 9, an embodiment is illustrated of a method for arranging data handling that assigns reliability ratings to various existing physical entities of the computer-implemented system, and, in response to change, re-arranges data handling with respect to at least a portion of the existing computer-implemented system physical entities, using the assigned reliability ratings in accordance with reverse predictive failure analysis, to provide a designated cumulative reliability rating. In other words, rather than wait for a change to possibly result in the disruption to the system caused by a failure or predicted failure of an individual physical entity or component, reverse predictive failure analysis is employed to re-arrange the data handling in advance to provide a designated cumulative reliability rating for the system. The designated cumulative reliability rating is set by the user to define a level of comfort to the user that the system is reliable.

In step 200, information is gathered that relates to defined physical entities of the computer-implemented data handling system. The information is for analysis with respect to reliability. The information may relate to the specific entities being analyzed or may relate to the specific entities as well as entities of the same type or use, and for which information is available. Examples include reliability information provided by a manufacturer, or failure information gathered by the user for all similar devices owned or serviced by the user, or information available to a servicer of the system. The information comprises any suitable technique for predictive failure analysis.

In one embodiment, information regarding usage over time of a plurality of physical entities of at least one given type are aggregated and updated to identify changes and trends.

Step 200, in one embodiment, is performed continuously. In another embodiment, step 200 is performed periodically or on demand.

Physical entities of the same type, for example, of the same model number and year or month of manufacture, tend to have similar reliability or failure characteristics. Thus, failure information about other such entities, for as many of the entities as are known to the user, may provide a failure model that is applicable to a present such entity, even if the present entity has not yet exhibited a problem. In one possibility, the aggregated information may indicate excellent reliability of a type of physical entity until reaching 10,000 hours of continuous use, after which failures occur rapidly.

In step 203, the information of step 200 is analyzed and at least one reliability rating is assigned as a function of the aggregate information to at least one of the physical entities. The analysis may rely on any technique for failure analysis. The reliability rating may comprise the likelihood of failure or the likelihood of reliable performance, which is the inverse of failure.

The analysis may employ trend analysis, the approach of limits determined from the analysis of like devices or entities, information such as predicted failure-free lifetimes, etc., and assign the reliability rating(s) accordingly. The reliability ratings may differ depending on the type of data handling. For example, a write operation requires maximum reliability to insure that data is stored correctly, while a read operation may be repeated without harm to the data. An example of a reliability rating may be that there is a 0.003 probability of failure or a 99.997 probability of reliable performance with respect to a certain type of data handling over a given period of time. Alternatively, a reliability rating may comprise a rating without enumerating the probability of reliable performance, such as "9" out of "10". The rating may be determined by the user, the user may establish criteria for the ratings, or a default rating system may be employed.

If there are no changes of significance, the reliability rating(s) will be unchanged. If there are changes of significance, the new reliability rating(s) may be different from the previous reliability rating(s).

Steps 205, 206, 207 and 208 each examines whether a change of significance has occurred.

Step 205 determines whether there is a change to the capacity of the system in which the entities are being rated. In one example, a portion of a memory, or a data storage drive, or a switch, etc., may be removed from the system or network. Alternatively, a memory device, data storage drive, switch, etc., may be added to the system or network.

Step 206 determines whether there is a change or alteration to the type of data handling. For example, an application that functions to write critical data will require maximum reliability to insure that data is stored correctly, while an application that functions to read images where the loss of data can be tolerated or where read operations may be repeated without harm to the data will require a lesser reliability. For example, if the system workload changes from read applications to write applications, the change of type of data handling is significant.

Step 207 follows the reliability ratings of step 203 and notes whether the reliability rating of one or more of the components, or the mean of all the components, has changed.

For example, a device or component may have reached a point in its life that the likelihood for reliable performance has changed. One example comprises an HDD spare-sector table that is monitored, and if the table is at the point where it is rapidly filling up because of failing sectors within the drive, a threshold may be reached which indicates imminent failure of the drive, changing its reliability rating.

Step 208 comprises any other change to the system that may affect the reliability of the system or its uses.

One or more of the monitored changes or alterations of steps 205, 206, 207 and 208, in one embodiment, has a threshold that ignores changes of minor significance. If there is no change or the threshold is not met, the process returns to step 203.

In an alternative embodiment, steps 205 and 206 are performed before step 203 and the reliability ratings determined only after a determination that there is a change to the capacity of step 205 or after a determination that the type of data handling is changing.

Step 210 determines a cumulative reliability rating for at least one data handling arrangement in accordance with reverse predictive failure analysis. The determination comprises statistical and/or mathematical analysis. In one embodiment, the cumulative reliability rating is determined for various alternative data handling arrangements. For example, referring additionally to FIG. 2, the cumulative reliability rating is determined for the network 110, employing the aggregation layer switches 115 having the greatest reliability, and an alternative reliability rating is determined employing only the fastest aggregation layer switches 115. In another alternative, the cumulative reliability rating is determined for the network 110, employing the aggregation layer switches 115 having the greatest capacity. Of the alternatives that meet the designated rating, the one best meeting another objective may be selected. In another example, referring to FIG. 4, the cumulative reliability rating is determined for the data storage 140, employing each of the levels of data storage. An alternative cumulative reliability rating is determined for the data storage 140, bypassing level 161 by using path 220, FIG. 4. Bypassing one level may limit the ability to speedily access or stage certain data but may be necessary to meet the designated cumulative reliability rating.

The cumulative reliability rating, in one embodiment is a mathematical model. In one example, the model is of a level of storage 140, where the reliability rating of various devices of the level is squared, the squares summed and the square root taken of the sum.

$$\text{Composite Rating} = \text{SQRT}[\text{Rating}\_1^2 + \text{Rating}\_2^2 + \text{Rating}\_3^2]$$

Alternately, the root-mean-squared (RMS) composite rating can be employed by dividing the sums-of-the-squares of the component ratings by the number of component ratings (in this case 3) before taking the square-root.

$$\text{RMS Rating} = \text{SQRT}[(\text{Rating}\_1^2 + \text{Rating}\_2^2 + \text{Rating}\_3^2)/3]$$

Alternative mathematical models are useable to estimate the resultant reliability of the system using the reliability ratings of components of the system. The reliability ratings used in the model may comprise the likelihood of failure or the likelihood of reliable performance, which is the inverse of failure. Thus, the model is directed to converting the individual reliability ratings to a cumulative rating based on reverse predictive failure analysis, which is the probability of reliable performance.

Step 230 selects an arrangement of the data handling with respect to at least a portion of the existing computer-implemented system physical entities, using the assigned reliability ratings in accordance with reverse predictive failure analysis, to provide a designated cumulative reliability rating.

The designated cumulative reliability rating may comprise a minimum reliability rating, a reliability rating range, or a reliability rating combined with another rating or model covering another aspect of the data handling, such as speed or data handling capacity.

Figure 10:
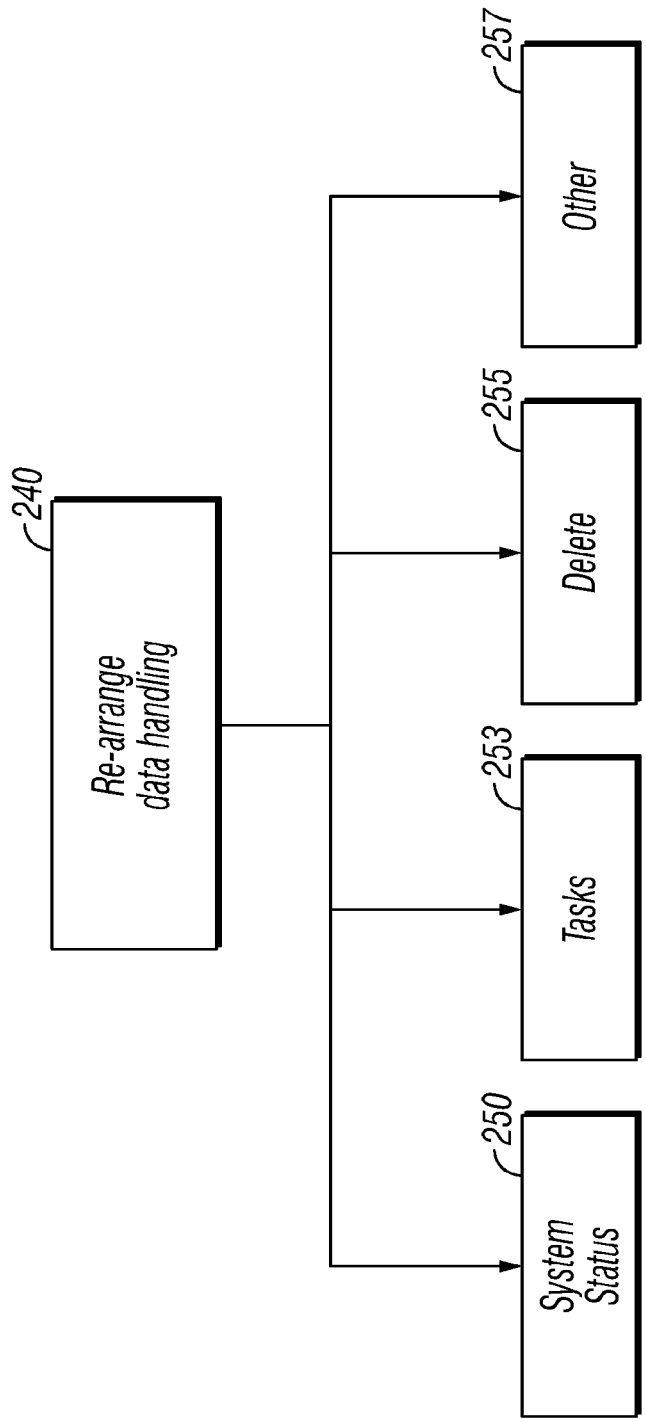
FIG. 10 is a flow chart depicting an exemplary method of selecting a re-arrangement of FIG. 9.

In step 240, the data handling is re-arranged in accordance with the selection of step 230. Referring to FIGS. 1 and 10, a host 120 of the system 100 implements the selection of step 240. Alternatively, a storage controller 135 of the system implements the selection of step 240.

One option is to change a system status 250, for example, of a data storage 140 entity from a RAID-4 to a RAID-6, by converting one of the data storage drives from handling data to handling parity of the data of the remaining data storage drives.

Another option is to change the network tasks to utilize different ones of the network components 253, for example, by exchanging or swapping a switch for another switch in the network 110. Referring additionally to FIG. 2, the exchange is implemented by changing the connection pairings of the switches in the adjacent layers. In one example, switches 112 and 115 are directed to change the connection pairings from one of the switches 113 to another of the switches.

Another option is deletion 255. Referring additionally to FIG. 4, the data storage system comprises a hierarchical data storage system of a plurality of rungs of data storage, and the rearranging comprises deleting at least one of the plurality of rungs from data storage. In one embodiment, the deletion is implemented by directing the storage manager application to stage and destage data directly between levels 160 and 162, bypassing level 161 and employing data handling path 220.

Another form of deletion 255 is to delete at least one of the physical entities with respect to the portion of the system. In one embodiment, data is no longer written or destaged to a failing data storage drive or to a failing portion of a flash memory 161.

Other options 257 may comprise adding formerly spare data storage drives 260 to a data storage system for replacement or for direct use with the data handling.

RAID data storage systems may be set up by hardware or software for data handling. If software, the data handling arrangement is implemented by the storage controllers 135 or the RAID data storage systems. Referring to FIGS. 9, 10, 11 and 12, steps 305 and 306 correspond to step 205 for a change to capacity involving an expansion of a RAID by the addition of data storage drives "Δn". Step 407 corresponds to step 207 and comprises a change in the failure rate "Δf" of one or more data storage drives in the RAID. Step 310 of FIG. 11 and step 410 of FIG. 12 each corresponds to step 210 and comprises determining the cumulative reliability rating of the current RAID array with the added data storage drives.

RAID systems are structured arrangements of data storage and adhere to specific formulations, making the determination of the cumulative reliability or inverse of the predicted failure of the entire array, herein called "PAF", mathematically determinable.

Steps 312 and 412 determine whether the reliability or the PAF after the change is acceptable such that the change of steps 305 and 407 is not significant enough to re-arrange the data storage. If the change results in acceptable reliability, the process is complete 314, 414. If the change is too great, steps 315 and 415 calculate the reliability from the PAF for other types of RAIDs.

The following is background for such determinations.

In all equations, (a) "n" denotes the total number of drives in the RAID, (b) "f" denotes the drive-failure probability, 0<f<<1, (c) "PAF" denotes the Probability of a total Array Failure, (d) "*" denotes multiplication, (e) "PPF" denotes the Probability of a total failure of a Pair of drives, and $\log_e(1-f) = -f$, for small f based on the Taylor Series expansion for $\log_e(1-f)$.

RAID-0

This equation can be used to model the probability of an array failure, PAF, of a RAID-0 array, where this RAID is totally failed if there are any failed drives at any one time. There are n data drives and 0 parity drives in this array.

$$PAF(\text{RAID-0}) = 1 - (1-f)n$$

Thus PAF(f, n) is a nonlinear surface which is a function of two variables, f and n. To better understand this surface, two partial derivatives are now calculated, $\partial PAF/\partial f$ and $\partial PAF/\partial n$.

$\partial PAF/\partial f = n(1-f)n-1 > 0$, meaning that if the drive-failure probability f increases, then the probability of a RAID-0 array failure, PAF, increases.

$\partial PAF/\partial n = -(1-f)n \log_e(1-f) = P(1-f)n > 0$, meaning that as the number of drives increases, then the probability of a RAID-0 array failure, PAF, increases.

$\partial 2PAF/\partial f2 = -n(n-1)(1-f)n-2 < 0$, meaning that the second incremental change in drive probability failure f is not as incrementally detrimental as the first incremental change in drive probability failure.

$\partial 2PAF/\partial n2 = (1-f)n \log_e(1-f) = -f2*(1-f)n < 0$, meaning that the second incremental change in the number of drives n is not as incrementally detrimental as the first incremental change in the number of drives.

The data-efficiency of a RAID-0 is 100% as there are no backup drives or parity drives.

RAID-1

This equation can be used to model the probability of an array failure, PAF, of a RAID-1 array, where this RAID is totally failed if there are any pairs of failed drives at any one time. There are n/2 data drives, and n/2 mirror drives, hence n/2 pairs of drives. A RAID-1 is essentially a set of paired drives, one drive of each pair is in a RAID-0 array and that drive is backed up by its mirrored drive in another RAID-0 array.

The probability of failure of one pair of drives is:

$$PPF(1\text{PAIR}) = f2$$

This gives the probability of an array failure of m-pairs of drives, where m=n/2, as:

$$PAF(\text{RAID-1}) = 1 - (1-f2)m$$

$\partial PAF/\partial f = -[(n/2)*(1-f2)m-1]*(-2f) = n*f*(1-f2)m-1 > 0$, meaning that if the drive-failure probability f increases, then the probability of a RAID-1 array failure, PAF, increases.

$\partial PAF/\partial m = -(1-f2)m \log_e(1-f2) = f2*(1-f2)m > 0$, meaning that as the number of drives increases, then the probability of a RAID-1 array failure, PAF, increases.

The data-efficiency of a RAID-1 is 50% as mirror-half of the drives are "backup" drives.

RAID 4 and RAID 5

This equation can be used to model the probability of an array failure, PAF, of a RAID-4 and a RAID-5 array, where this RAID is totally failed if there are more than 1 failed drive at any one time. The RAID-4 has n-1 data drives and 1 dedicated parity drive. The RAID-5 intermingles parity among all the drives, but effectively has n-1 drives worth of data and 1 drive worth of parity.

$$PAF(\text{RAID-4,-5}) = 1 - (1-f)n - n*f*(1-f)n-1$$

$\partial PAF/\partial f = n(1-f)n-1 - n*(1-f)n-1 + n*(n-1)*f(1-f)n-2$

Therefore, $\partial PAF/\partial f = n*(n-1)*f*(1-f)n-2 > 0$, meaning that if the drive-failure probability f increases, then the probability of a RAID-4, 5 array failure, PAF, increases.

$$\partial PAF/\partial n = -(1-f)n \log e(1-f) - f*(1-f)n-1 - n*f*(1-f)n-1 \log e(1-f)$$

$$\partial PAF/\partial n = -[(1-f)n + n*f*(1-f)n-1]*\log e(1-f) - f*(1-f)n-1$$

$$\partial PAF/\partial n = -\{[(1-f) + n*f]*\log e(1-f) - f\}*(1-f)n-1$$

$\log e(1-f) = -f$, for small f based on the Taylor Series expansion for $\log e(1-f)$.

$$\partial PAF/\partial n = -\{[(1-f) + n*f]*(-f) - f\}*(1-f)n-1$$

Because the minimum number of drives for RAID-4 and RAID-5 is n=3:

$$\partial PAF/\partial n = \{1 - f + n*f + 1\}*f*(1-f)n-1 = \{2 + (n-1)*f\}*f*(1-f)n-1 > 0,$$

meaning that as the number of drives increases, then the probability of a RAID-4 or RAID-5 array failure, PAF, increases.

The data-efficiency of a RAID-4 and a RAID-5 is (n−1)/n as there is one parity drive.

RAID 6

And this equation can be used to model the probability of an array failure, PAF, of a RAID-6 array, where this RAID is totally failed if there are more than 2 failed drives at any one time. There are n−2 data drives and 2 parity drives in this array, where typically one parity drive has row parity and the other parity drive has diagonal parity.

$$PAF(RAID-6) = 1-(1-f)n - n*f*(1-f)n-1 - (n/2)*(n-1)*f2*(1-f)n-2$$

$$\partial PAF/\partial f = n(1-f)n-1 - n*(1-f)n-1 + n*(n-1)*f*(1-f)n-2 - (n/2)*(n-1)*2f*(1-f)n-2 + (n/2)*(n-1)*(n-2)*f2*(1-f)n-3$$

Therefore, $\partial PAF/\partial f = (n/2)*(n-1)*(n-2)*f2*(1-f) n-3 > 0$, meaning that if the drive-failure probability f increases, then the probability of a RAID-6 array failure increases. Please note that the minimum number of drives in a RAID-6 is n=4.

$$\partial PAF/\partial n = -(1-f)n \log e(1-f) - f*(1-f)n-1 - n*f*(1-f)n-1 \log e(1-f)$$

$$-(\tfrac{1}{2})*(2n-1)*f2*(1-f)n-2 - (n/2)*(n-1)*f2*(1-f)n-2 \log e(1-f)$$

$$\partial PAF/\partial n = f(1-f)n - f*(1-f)n-1 + n*f2*(1-f)n-1$$

$$(\tfrac{1}{2})*(2n-1)*f2*(1-f)n-2 + (n/2)*(n-1)*f3*(1-f)n-2$$

$$\partial PAF/\partial n = [(1-f)2 + \{-1 + n*f\}*(1-f) - (\tfrac{1}{2})*(2n-1)*f + (n/2)*(n-1)*f2]*f*(1-f)n-2$$

$$\partial PAF/\partial n = [1 - 2f + f2 - 1 + n*f - nf2 - nf + (\tfrac{1}{2})*f + (n/2)*(n-1)*f2]*f*(1-f)n-2$$

$$\partial PAF/\partial n = [-f + f2 + n*f - nf2 + (\tfrac{1}{2})*f + (n/2)*(n-1)*f2]*f*(1-f)n-2$$

$$\partial PAF/\partial n = [-1 + f + n - nf + (\tfrac{1}{2}) + (n/2)*(n-1)*f]f2*(1-f)n-2$$

$$\partial PAF/\partial n = [(2n-1) + 2*(1-n)f + n*(n-1)*f]*f2*(1-f)n-2/2$$

$$\partial PAF/\partial n = [(2n-1) + (n2 - 3n + 2)*f]*f2*(1-f)n-2/2$$

$$\partial PAF/\partial n = [(2n-1) + (n-2)*(n-1)*f]*f2*(1-f)n-2/2 > 0,$$

meaning that as the number of drives increases, then the probability of a RAID-6 array failure, PAF, increases.

The data-efficiency of a RAID-6 is (n−2)/n as there are two parity drives.

Figure 11:
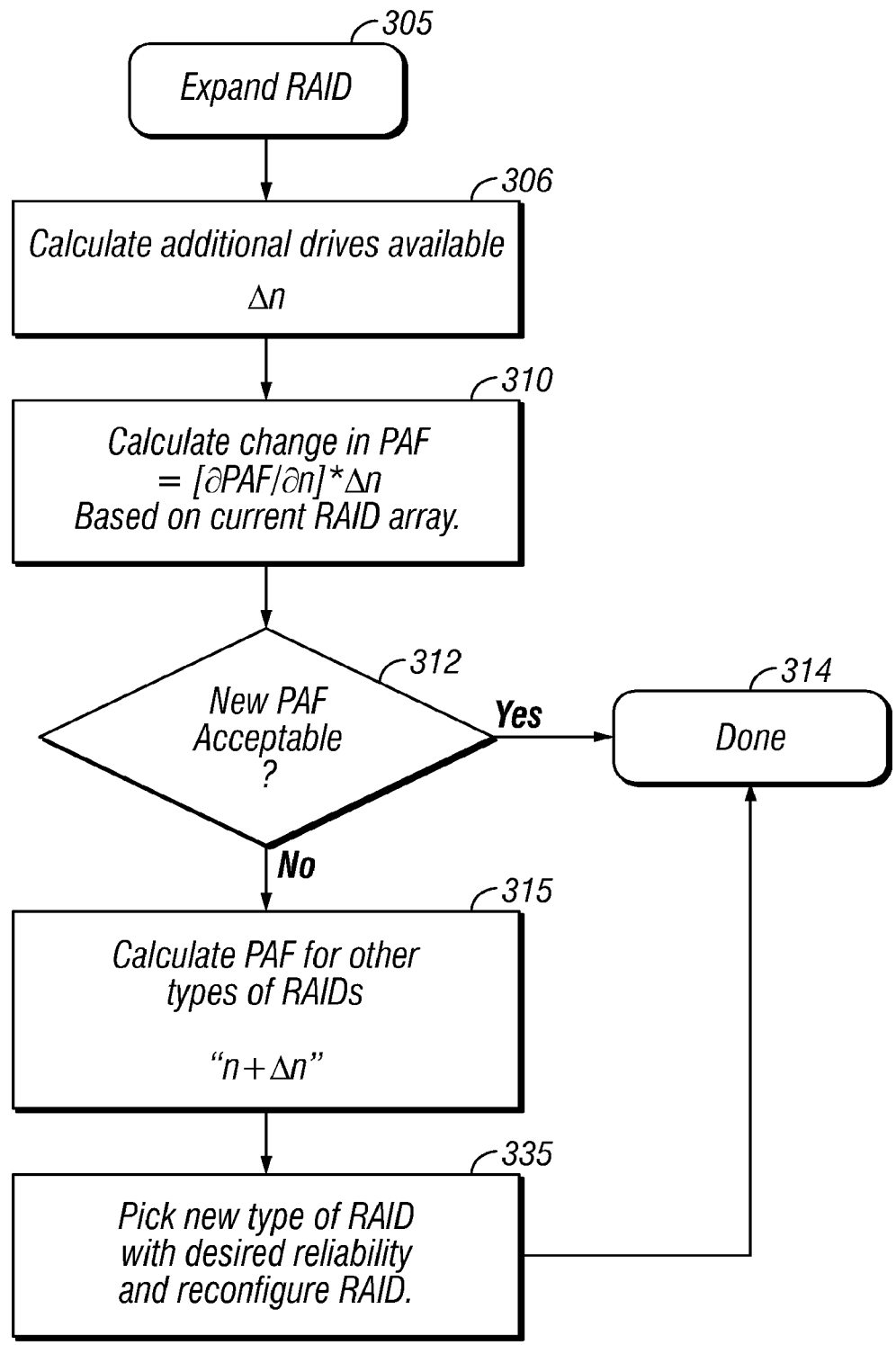
FIG. 11 is a flow chart depicting an exemplary method of re-arranging data handling of a RAID system where the change is an expansion.
Figure 12:
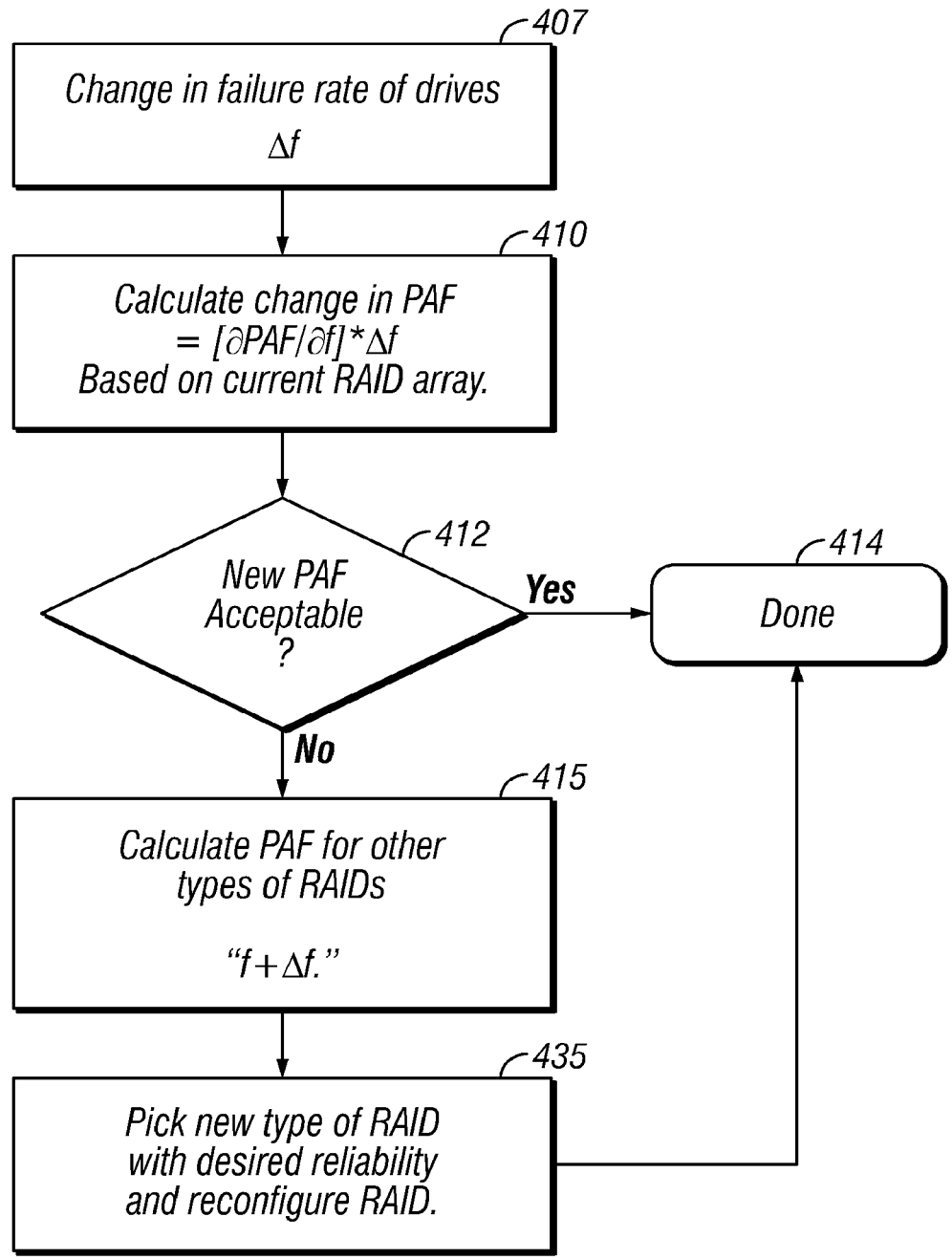
FIG. 12 is a flow chart depicting an exemplary method of re-arranging data handling of a RAID system where the change is a change in failure rate of drives.

The steps 310 and 315 of FIG. 11 and steps 410 and 415 of FIG. 12 comprise estimating changes to the probability of total array failure PAF.

In one embodiment, the above partial derivative equations can be used to estimate changes to the probability of total array failure, PAF(n+Δn, f+Δf), based on (a) changes to the number of drives in the RAID, Δn, (b) changes to the drive-failure probability, Δf, and (c) the current PAF(n, f).

$$PAF(f+\Delta f, n+\Delta n) = PAF(f,n) + (\partial PAF/\partial f)*\Delta f + (\partial PAF/\partial n)*\Delta n$$

If the probability of a drive failure, f, is falling and approaching zero, more drives "n" may be added to all RAIDs without increasing the PAF of that type of RAID. However, if f is increasing, adding more drives to a given form of RAID could be disastrous. If f is increasing and more drives are needed for more storage, the type of RAID may have to be changed from RAID-4 or RAID-5 to RAID 6, for example, or creating new RAID arrays rather than adding drives to existing arrays. Comparing PAF(f+Δf, n+Δn) against a user defined threshold would trigger this decision-making.

Another way of looking at this is that the incremental change to the probability of a total array failure is:

$$\Delta PAF = PAF(f+\Delta f, n+\Delta n) - PAF(f,n) = (\partial PAF/\partial f)*\Delta f + (\partial PAF/\partial n)*\Delta n$$

Thus, the cumulative reliability rating in accordance with reverse predictive failure analysis is determined in accordance with the following equation:

$$1-[PAF(f+\Delta f, n+\Delta n)] = 1-[PAF(f,n) + (\partial PAF/\partial f)*\Delta f + (\partial PAF/\partial n)*\Delta n]$$

where:
PAF=probability of failure of the array
f=probability of failure of a physical entity
n=number of drives in the array In a RAID data storage system comprising a plurality of data storage physical entities arranged in an array to provide data storage and parity storage, an embodiment comprises the steps of assigning at least one reliability rating to various physical entities of the RAID data storage system, determining the cumulative reliability of the RAID data storage system using the assigned reliability ratings in response to change, and, if the change is significant enough to re-arrange the data handling, then re-arranging the data handling with respect to a portion of the data storage physical entities, using the assigned reliability ratings in accordance with reverse predictive failure analysis, to provide a designated cumulative reliability rating.

Referring to FIGS. 9, 11 and 12, the analysis of steps 315 and 335 and of steps 415 and 435 is in accordance with the analysis of steps 210, 230 and 240.

FIG. 11 relates to the expansion of a RAID by adding additional data storage drives Δn in step 305. The analysis of step 315 is conducted if the additional data storage drives reduces the reliability 1−[PAF(f, n+Δn)] below a desired cumulative reliability rating as determined in step 312. The analysis of step 315 comprises the calculation of the PAF for other types of RAIDs given the new capacity n+Δn. For example, if the existing RAID is a RAID-4, the calculation could switch to a new RAID-6 with the same number of data storage drives, but with one of the new data storage drives utilized for parity instead of data. Alternatively, the RAID may be altered from parity RAID (e.g. RAID-6) to mirrored RAID (RAID-1). Step 335 picks the new type of RAID based on the calculated cumulative reliability rating meeting the designated cumulative reliability rating established by the user or host system. The data handling is re-arranged in accordance with the selected new RAID type in step 240 of FIG. 9.

FIG. 12 relates to a change in the failure rate(s) $\Delta f$ of data storage drives determined in step 407. The analysis of step 415 is conducted if the resultant cumulative reliability rating $1-[PAF(f+\Delta f, n)]$ is below a desired cumulative reliability rating as determined in step 412. The analysis of step 415 comprises the calculation of the PAF for other types of RAIDs given the new failure rate $f+\Delta f$. For example, if the existing RAID is a RAID-4, the calculation could switch to a new RAID-6 with the same number of data storage drives, but with one of the new data storage drives utilized for parity instead of data. Alternatively, the RAID may be altered from parity RAID to mirrored RAID. Step 435 picks the new type of RAID based on the calculated cumulative reliability rating meeting the designated cumulative reliability rating established by the user or host system. The data handling is re-arranged in accordance with the selected new RAID type in step 240 of FIG. 9.

Figure 13:
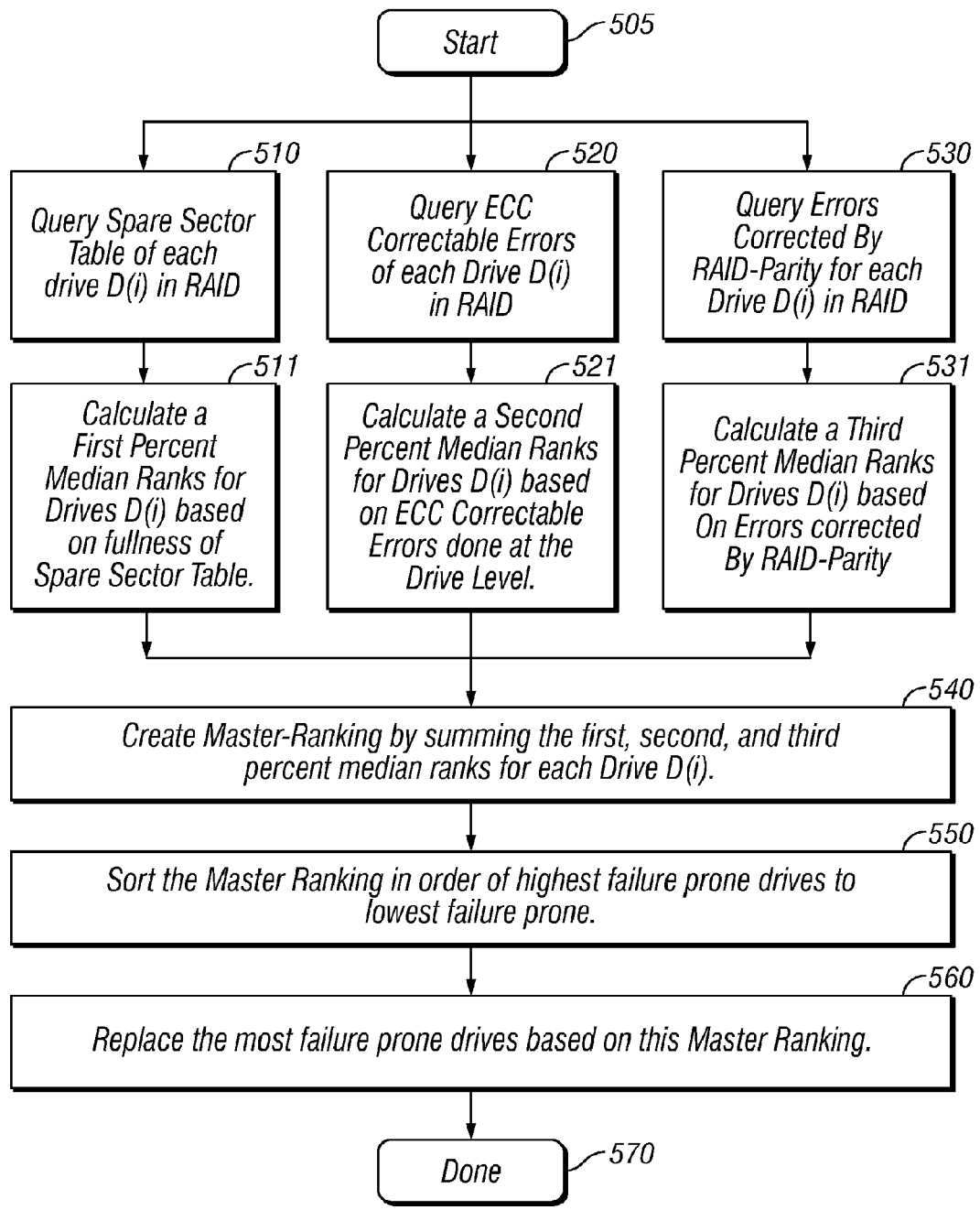
FIG. 13 is a flow chart depicting an exemplary method of re-arranging data handling of a RAID system.

FIG. 13 represents an embodiment of an alternative methodology for selecting an arrangement to provide the designated cumulative reliability rating 230 of FIG. 9 that does not require changing the type of RAID, starting at step 505.

One, a combination, or all, of various steps are conducted to determine the reliability of the data storage drives. In one example, step 510 queries the spare sector table of each of the data storage drives D(i) in the RAID, and step 511 calculates a ranking for the drives D(i), for example of percentage fullness of the spare sector table. In another example, step 520 queries the ECC correctable errors of each of the data storage drives D(i) in the RAID, and step 521 calculates a ranking for the drives D(i), for example of the percentage of ECC correctable errors at the drive. These measurements are related in that the ECC may be able to correct a number of failed bits out of a unit of data, but reaches a limit where the data cannot be corrected. Thus, a threshold is set at a level above which the number of correctable errors indicates that the drive is close enough to the limit that there is a risk that data will be lost in the near future. (For example, the ECC may correct 9 bits out of a sector comprising 512 bytes of data, and the threshold is set at 7 bits). Failure of the drive having the bad sector is prevented or postponed by moving the data to another sector of the drive, typically called a spare sector.

Step 530 queries the use of RAID parity for each drive D(i) in the RAID. RAID parity is used when the ECC is unable to correct the data, and the redundancy in the RAID is employed to determine the data, for example by employing the parity in combination with the other data at the same row in the RAID to fill in the data that could not be corrected and is in error. Step 531 calculates a ranking for the drives D(i), for example of the percentage of RAID parity corrected errors at the drive.

Step 540 creates a master ranking by summing the selected ones of the percentage rankings of steps 511, 521 and 531 for each drive D(i).

Step 550 sorts the master ranking in order of highest failure prone drives to the lowest failure prone. In conducting the sorting, one of the rankings, for example the ranking of step 531, may be given more weight than the other rankings.

Step 560 corresponds to steps 230 and 240 of FIG. 9, and comprises replacing the most failure prone data storage drives based on the master ranking, for example with spare drives 260 of FIG. 1, and the process completes at step 570.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. In a computer-implemented system comprising a plurality of existing physical entities, a method for arranging data handling, comprising:

assigning at least one reliability rating to various said existing physical entities of said computer-implemented system; and using said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)] = 1-[PAF(f,n)+(\partial PAF/\partial f)*\Delta f + (\partial PAF/\partial n)*\Delta n],$$

where:
PAF=probability of failure of said computer-implemented system,
f=probability of failure of a physical entity, and
n=number of drives in said computer-implemented system.

2. The method of claim 1, additionally comprising, in response to change, re-arranging said data handling with respect to at least a portion of said existing computer-implemented system physical entities, using said assigned reliability ratings in accordance with reverse predictive failure analysis, to provide a designated cumulative reliability rating.

3. The method of claim 2, wherein said re-arranging comprises deleting at least one of said physical entities with respect to said portion of said system.

4. The method of claim 3, wherein said system comprises a hierarchical data storage system of a plurality of rungs of data storage, and said re-arranging comprises deleting at least one of said plurality of rungs from data storage, skipping said deleted at least one rung.

5. The method of claim 2, wherein said rearranging comprises changing the system status of at least one of said physical entities with respect to said portion of said system.

6. The method of claim 1, additionally comprising the steps of aggregating and updating information regarding usage over time of a plurality of physical entities of at least one given type, and assigning at least one said reliability rating as a function of said aggregate information to at least one of said physical entities.

7. The method of claim 1, wherein the type of said data handling is subject to alteration; and said re-arranging is conducted to match said alteration.

8. The method of claim 7, wherein said change comprises a change in capacity of said system.

9. The method of claim 1, wherein said reliability ratings are subject to change, and said step of assigning said at least one reliability rating comprises assigning updated reliability ratings to said existing physical entities.

10. The method of claim 1, wherein said system comprises a network having network components, and wherein said re-arranging comprises changing the network tasks to utilize different ones of said network components.

11. In a RAID data storage system comprising a plurality of data storage physical entities arranged in an array to provide data storage and parity storage, a method comprising the steps of:

assigning at least one reliability rating to various said data storage physical entities of said RAID data storage system; and using said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)] = 1-[PAF(f,n)+(\partial PAF/\partial f)*\Delta f + (\partial PAF/\partial n)*\Delta n],$$

where:
PAF=probability of failure of said array,
f=probability of failure of a physical entity, and
n=number of drives in said array.

12. The method of claim 11, additionally comprising, in response to change, re-arranging said data handling with respect to at least a portion of said existing computer-implemented system physical entities, using said assigned reliability ratings in accordance with reverse predictive failure analysis, to provide a designated cumulative reliability rating.

13. The method of claim 12, wherein said re-arranging comprises changing a portion of data handling within said RAID from data storage to parity storage.

14. The method of claim 12, wherein said change comprises dynamic changes to said RAID data storage system, resulting in a change to a cumulative reliability rating.

15. The method of claim 11, additionally comprising the steps of aggregating and updating information regarding usage over time of a plurality of data storage physical entities of at least one given type, and assigning at least one said reliability rating as a function of said aggregate information to at least one of said data storage physical entities.

16. The method of claim 11, wherein said change comprises failure of a portion of said RAID data storage system.

17. A computer-implemented system comprising:
a plurality of existing physical entities; and
a computer-implemented data handling control implementing a method comprising the steps of:
assigning at least one reliability rating to various said existing physical entities of said computer-implemented system; and
using said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)]=1-[PAF(f,n)+(\partial PAF/\partial f)*\Delta f+(\partial PAF/\partial n)*\Delta n],$$

where:
PAF=probability of failure of said computer-implemented system,
f=probability of failure of a physical entity, and
n=number of drives in said computer-implemented system.

18. The system of claim 17, additionally comprising, in response to change, re-arranging said data handling with respect to at least a portion of said existing computer-implemented system physical entities, using said assigned reliability ratings in accordance with reverse predictive failure analysis, to provide a designated cumulative reliability rating.

19. The system of claim 18, wherein said re-arranging comprises deleting at least one of said physical entities with respect to said portion of said system.

20. The system of claim 19, wherein said system comprises a hierarchical data storage system of a plurality of rungs of data storage, and said re-arranging comprises deleting at least one of said plurality of rungs from data storage, skipping said deleted at least one rung.

21. The system of claim 18, wherein said rearranging comprises changing the system status of at least one of said physical entities with respect to said portion of said system.

22. The system of claim 17, additionally comprising the steps of aggregating and updating information regarding usage over time of a plurality of physical entities of at least one given type, and assigning at least one said reliability rating as a function of said aggregate information to at least one of said physical entities.

23. The system of claim 17, wherein the type of said data handling is subject to alteration; and said re-arranging is conducted to match said alteration.

24. The system of claim 23, wherein said change comprises a change in capacity of said system.

25. The system of claim 17, wherein said reliability ratings are subject to change, and said step of assigning said at least one reliability rating comprises assigning updated reliability ratings to said existing physical entities.

26. The system of claim 17, wherein said system comprises a network having network components, and wherein said re-arranging comprises changing the network tasks to utilize different ones of said network components.

27. A RAID data storage system comprising:
a plurality of data storage physical entities arranged in an array to provide data storage and parity storage; and
RAID management configured to:
assign at least one reliability rating to various said data storage physical entities; and
using said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)]=1-[PAF(f,n)+(\partial PAF/\partial f)*\Delta f+(\partial PAF/\partial n)*\Delta n],$$

where:
PAF=probability of failure of said array,
f=probability of failure of a physical entity, and
n=number of drives in said array.

28. The RAID data storage system of claim 27, additionally comprising, in response to change, re-arranging said data handling with respect to at least a portion of said existing computer-implemented system physical entities, using said assigned reliability ratings in accordance with reverse predictive failure analysis, to provide a designated cumulative reliability rating.

29. The RAID data storage system of claim 28, wherein said re-arranging comprises changing a portion of data handling within said RAID from data storage to parity storage.

30. The RAID data storage system of claim 28, wherein said change comprises failure of a portion of said RAID data storage system.

31. The RAID data storage system of claim 27, additionally comprising the steps of aggregating and updating information regarding usage over time of a plurality of data storage physical entities of at least one given type, and assigning at least one said reliability rating as a function of said aggregate information to at least one of said physical entities.

32. A computer program product for arranging data handling by at least one computer-implemented processor for a computer-implemented system comprising a plurality of existing physical entities, said computer program product comprising a non-transitory computer-usable storage medium having non-transient computer-usable program code embodied therein, comprising:
computer-usable program code for said processor to assign at least one reliability rating to various said existing physical entities of said computer-implemented system; and
computer-usable program code for said processor to use said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)]=1-[PAF(f,n)+(\partial PAF/\partial f)^*\Delta f+(\partial PAF/\partial n)^*\Delta n],$$

where:

PAF=probability of failure of said computer-implemented system, f=probability of failure of a physical entity, and n=number of drives in said computer-implemented system.

33. The computer program product of claim 32, additionally comprising computer-usable program code for, in response to change, re-arrange said data handling with respect to at least a portion of said existing computer-implemented system physical entities, using said assigned reliability ratings in accordance with reverse predictive failure analysis, to provide a designated cumulative reliability rating.

34. The computer program product of claim 33, wherein said re-arranging comprises deleting at least one of said physical entities with respect to said portion of said system.

35. The computer program product of claim 34, wherein said system comprises a hierarchical data storage system of a plurality of rungs of data storage, and said re-arranging comprises deleting at least one of said plurality of rungs from data storage, skipping said deleted at least one rung.

36. The computer program product of claim 33, wherein said rearranging comprises changing the system status of at least one of said physical entities with respect to said portion of said system.

37. The computer program product of claim 32, additionally comprising computer-usable program code for said processor to aggregate and update information regarding usage over time of a plurality of physical entities of at least one given type, and assign at least one said reliability rating as a function of said aggregate information to at least one of said physical entities.

38. The computer program product of claim 32, wherein the type of said data handling is subject to alteration; and said re-arranging is conducted to match said alteration.

39. The computer program product of claim 38, wherein said change comprises a change in capacity of said system.

40. The computer program product of claim 32, wherein said reliability ratings are subject to change, and said computer-usable program code for assigning said at least one reliability rating comprises assigning updated reliability ratings to said existing physical entities.

41. The computer program product of claim 32, wherein said system comprises a network having network components, and wherein said re-arranging comprises changing the network tasks to utilize different ones of said network components.

42. A computer program product for arranging data handling by at least one computer-implemented processor for a RAID data storage system comprising a plurality of data storage physical entities arranged to provide data storage and parity storage, said computer program product comprising computer-usable storage medium having non-transient computer-usable program code embodied therein, comprising:

computer-usable program code for said processor to assign at least one reliability rating to various said data storage physical entities; and computer-usable program code for said processor to use said assigned reliability ratings in accordance with reverse predictive failure analysis, to provide a designated cumulative reliability rating, said designated cumulative reliability rating is determined in accordance with the following equation:

$$1-[PAF(f+\Delta f, n+\Delta n)]=1-[PAF(f,n)+(\partial PAF/\partial f)^*\Delta f+(\partial PAF/\partial n)^*\Delta n],$$

where:

PAF=probability of failure of said array, f=probability of failure of a physical entity, and n=number of drives in said array.

43. The computer program product of claim 42, additionally comprising computer-usable program code for, in response to change, re-arrange said data handling with respect to at least a portion of said existing computer-implemented system physical entities, using said assigned reliability ratings in accordance with reverse predictive failure analysis, to provide a designated cumulative reliability rating.

44. The computer program product of claim 43, wherein said re-arranging comprises changing a portion of data handling within said RAID from data storage to parity storage.

45. The computer program product of claim 43, wherein said change comprises dynamic changes to said RAID data storage system, resulting in a change to a cumulative reliability rating.

46. The computer program product of claim 42, additionally comprising computer-usable program code for said processor to aggregate and update information regarding usage over time of a plurality of data storage physical entities of at least one given type, and assign at least one said reliability rating as a function of said aggregate information to at least one of said physical entities.

47. The computer program product of claim 42, wherein said change comprises failure of a portion of said RAID data storage system.

* * * * *